Nov. 2, 1943. C. V. LITTON Re. 22,389

ELECTRON BEAM CONCENTRATING SYSTEM

Original Filed July 13, 1940

INVENTOR.
CHARLES V. LITTON
R. C. Hargood
ATTORNEY.

Reissued Nov. 2, 1943 Re. 22,389

UNITED STATES PATENT OFFICE 22,389

ELECTRON BEAM CONCENTRATING SYSTEM

Charles V. Litton, Redwood City, Calif., assignor to International Standard Electric Corporation, New York, N. Y., a corporation of Delaware Original No. 2,305,884, dated December 22, 1942, Serial No. 345,284, July 13, 1940. Application for reissue July 29, 1943, Serial No. 496,626

5 Claims. (Cl. 315—6)

This invention relates to systems for concentrating a beam of electrons and more particularly to means for concentrating a beam of electrons in a velocity modulated tube.

There are many systems in which a beam of electrons is used. In such systems it is often desirable that a beam of electrons be concentrated as much as possible. For example, in vacuum tube systems operating on the principle of velocity modulation it is desirable that the circuits controlling the velocity modulation and for extraction of energy from the beam be arranged so that no electrons collide with elements in the circuit. However, in order to effectively control the electron beam it is necessary that the controlling electric fields be effective substantially throughout the cross-sectional area of the beam.

In systems previously proposed this is accomplished by means of a grid electrode arranged extending into the area of the beam. This electrode is generally formed of flat metal sheets arranged edgewise to the electron beam. Even with this precaution it is found that considerable energy is lost by collision of electrons with the grid and a consequent heating thereof.

If means is provided for concentrating the beam to a very small diameter, then a single opening may be provided in an element of the circuit to control the beam and no grid electrode is required.

It is a principal object of my invention to provide magnetic means for concentrating a beam of electrons.

It is a further object of my invention to provide a magnetic circuit having a magnetic field distribution to produce the desired beam concentration.

It is a still further object of my invention to provide a velocity modulated vacuum tube in which grid electrodes are not required.

According to my invention I accomplish the above objects and other objects by providing a magnetic circuit having a field of high intensity converging in the direction of travel of an electron beam. This field may be formed by means of electromagnets or permanent magnets arranged so that the lines of magnetic force converge around the beam.

In a velocity modulated tube the beam may be concentrated to a very small diameter. If then the beam is passed successively through resonant cavities to produce velocity modulation, and to extract energy from the beam, only small openings need be provided and no grid in the usual meaning of the term is needed to distribute the electric potential thereacross.

A better understanding of my invention may be obtained from the particular description of particular embodiments thereof taken with the accompanying drawing, in which.

Figure 1:
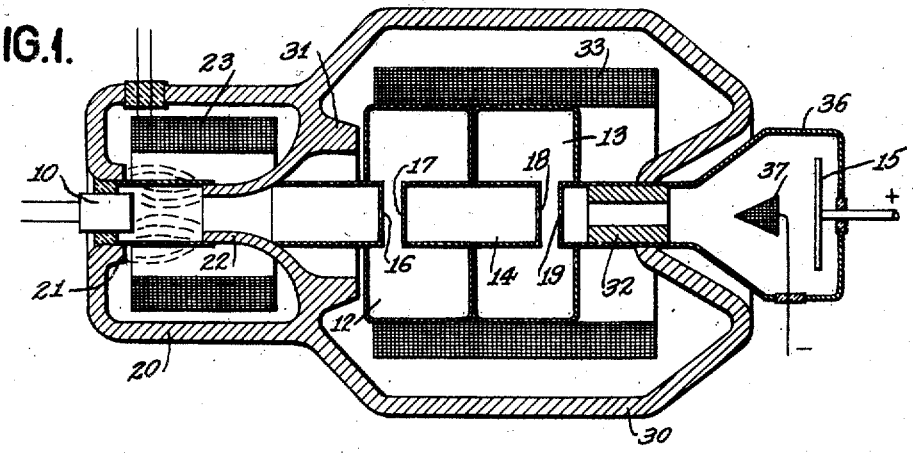
Fig. 1 shows an embodiment used to explain the principles of my invention.

In Fig. 1 is disclosed an embodiment of a velocity modulation tube incorporating one form of magnetic concentration arrangement in accordance with my invention. In this arrangement is provided a cathode 10 for emitting electrons which are formed in a beam by any suitable accelerating means, for example, by application of a positive potential to the other portion of the tube structure such as the resonant cavity. The beam of electrons then may pass through resonant chambers 12 and 13. The resonant chamber 12 serves to modify the velocity of the electrons in the beam and may be referred to as the modulation circuit. Electrons so modulated then pass through tube 14 which permits the electrons to become bunched due to their changes in velocity caused in chamber 12. Resonant chamber 13 then may extract energy from the bunched electrons for application to any suitable circuit not shown. Circuit 13 will hereafter be referred to as the extractor circuit. The electrons after passing circuit 13 are then collected by collector or target electrode 15 so as to remove them from possible interference in the circuit.

In a velocity modulated tube it is necessary that some means be provided for applying a potential stress from modulation circuit 12 to the electron stream in order to control the velocity modulation. This is generally accomplished by arranging a grid across the area covered by the stream and connected to circuit 12 so that the potential of circuit 12 will be applied more or less uniformly over the stream. It has been found, however, that even though these grids are designed to be open mesh work, quite a number of electrons strike the grid and cause excessive heating. Such excessive heating serves as a power limitation to which the tube can operate. Furthermore, in order to achieve high efficiency it is desirable that the depth of field penetration at the resonant circuit represents a small fraction of $\beta\gamma$ where $\gamma$ is the wavelength in free space and $\beta$ represents the velocity of the electron beam divided by the speed of light. This result may be obtained either by using a high velocity stream, or by reducing the size of the electrode opening or both.

In accordance with my invention I use no grid at all in connection with circuits 12 and 13 but use small size apertures such as 16, 17 in connection with resonant circuit 12 and in connection with circuit 13. These apertures are made sufficiently small so as to preserve substantially uniform control of the electrons in this stream and not permit any great depth of penetration.

In order that the small apertures may be used, I provide in accordance with my invention an arrangement for concentrating the electrons from a relatively large source such as cathode 10 to produce a beam having an increased density of electrons.

It is known that electrons traveling at any given velocity will tend to follow magnetic lines of force in a spiral path which path generally follows the lines of force. Accordingly, I utilize this principle for the purpose of producing a concentration of the electrons emitted from cathode 10. Thus, I provide a magnetic circuit indicated at 20, having a pole 21 and a second pole 22 both preferably, but not necessarily, of annular form. Pole 21 is placed outside cathode 10, while pole 22 is arranged with an opening of small diameter. Accordingly, a substantially frusto-conical field of magnetic force is set up between poles 21 and 22, as shown by dotted lines in Fig. 1. Electrons emitted from cathode 10 are thus concentrated by the magnetic field into a small beam. In order that the full efficiency of the system be retained, however, it is desired that a further concentration of the electron beam be made to assure that the beam is sufficiently small to pass through openings 16, 17, 18 and 19. In accordance with my invention this may be accomplished by an additional magnetic circuit 30, which is provided with pole pieces 31, 32. Pole piece 31 is an annulus of relatively large diameter, while pole piece 32 is an annulus of smaller diameter. The latter may be arranged inside the actual tube structure itself. This may be done by plating soft iron material with suitable plating material and welding or brazing it to the non-magnetic tube envelope material preferably copper. The small gap caused by the intervention of the copper layer in the magnetic circuit 30 may be of such small dimensions as to be unimportant with respect to the larger air gaps between pole pieces 31 and 32.

In order to secure relatively great concentration it is necessary that the magnetic field produced by magnetic circuits 20 and 30 be relatively strong. Accordingly, it is suitable to utilize electro-magnet for this purpose and to this end I provide magnetizing coils 23 and 33 associated with magnetic circuits 20 and 30, respectively. It is clear that if suitable magnetic concentration can be obtained, permanent magnets may be provided for the magnetic circuit instead of electro-magnets as shown. Preferably when electro-magnets are used the outer shell is made with openings (not shown) so that the tube and the magnet windings may be air cooled.

Furthermore, if desired, windings 23 and 33 may be provided on the outer portion of the magnetic circuit instead of being wound within the cores as shown in Fig. 1.

The concentrated beam of electrons after passing through apertures 18, 19, is conducted to an enclosure 36. However, the beam may be so highly concentrated that it is desirable to spread the beam somewhat before it is permitted to come in contact with the target electrode 15. This may be accomplished, for example, by provision of a conical shaped electrode 37 upon which is applied a negative potential which will serve to spread the electron beam outwardly. It is clear that other means may be used for spreading the electron beam, such as a transverse magnetic circuit, or a circuit having diverging magnetic lines, or a positive ring electrode tending to attract the electrons outwardly thereto.

In an actual trial of concentrating arrangements in accordance with my invention with a beam of electrons accelerated by a 3000 volt potential and by use of a field of several hundred gauss, substantially all of the electrons from a ⅝" diameter cathode were concentrated into a beam of 2 mm. in diameter. This concentration was done in a beam traveling a distance of 5", and having an intensity of 200 milliamperes, that is, an average density of about 64 milliamperes per square millimeter. It is clear that, while I have illustrated an application of my concentrating system to a velocity modulated tube arrangement, other applications of this arrangement may be found useful. It is clear that the principles of my invention with respect to the concentration of electron beams, while constituting a substantially essential combination in so far as the tube operation is concerned, may have other fields of application independent of the velocity modulated tube arrangement.

Figure 2:
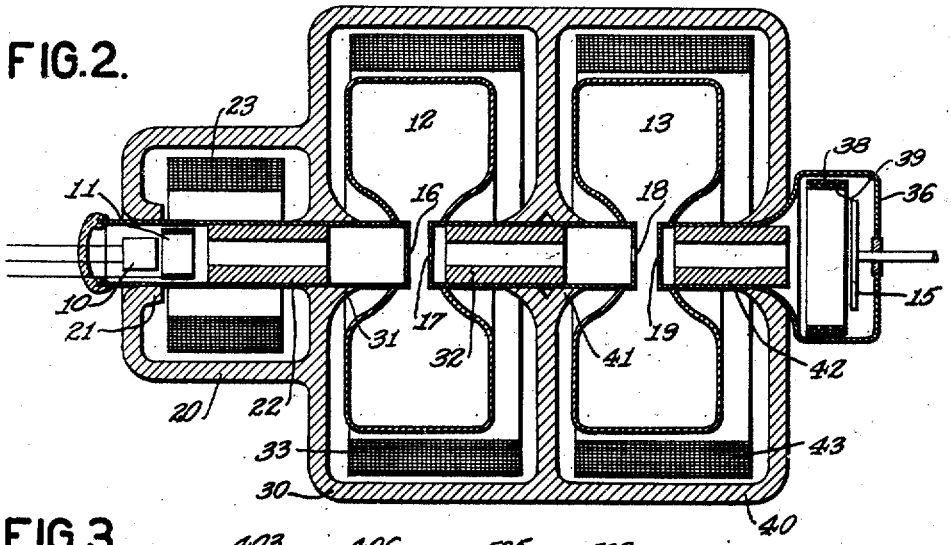
Fig. 2 shows a modification of my invention using a preferred distribution of magnetic fields.

While I have shown in Fig. 1 an embodiment of my invention for the purpose of explaining the operation thereof, it is clear that in some instances a circuit such as shown therein will be insufficient to produce the desired concentration. This is particularly true of the magnetic circuit related to the resonant chambers of the tube, since the air gap in this system may be so great that it is difficult to secure sufficient concentration of magnet fields at the point adjacent openings 16, 17, 18 and 19. In Fig. 2 is shown a modification of my invention, wherein separate magnetic circuits are provided about each of the resonant chambers of a velocity modulating tube. In this disclosure is shown a similar form of velocity modulating tube having a cathode 10, an accelerating electrode 11, resonant chambers 12, 13, with associated control openings 16, 17 and 18, 19, respectively and a target electrode 15. About the cathode end of the arrangement is provided a first magnetic circuit 20 with pole pieces 21, 22. Pole piece 22 is shown as arranged in the tube envelope structure and separated from magnetic circuit 20 by means of the thickness of the material therein. It is clear, however, that if desired this pole piece 22 may be sealed within the envelope, in the manner indicated in Fig. 1. When a sealing of this soft iron metal with the copper is provided in a tube structure it is desired that the proper materials be corrugated or modified in some manner so that unequal expansion of the two metals will not cause a break in the envelope destroying the vacuum.

Associated with resonant chamber 12, I provide a second magnetic circuit 30, pole pieces 31, 32. Thus the air gap across apertures 16, 17 is relatively small and a strong magnetic concentrating field may therefore be produced so as more effectively to stop down, narrow, or focus the beam as it passes through these openings.

Thus a third magnetic circuit 40 is provided about resonant circuit 13. This arrangement is provided with a pair of pole pieces 41, 42, which provide a narrow air gap across openings 18, 19 so as to concentrate the beam while passing therethrough.

Individual energizing coils 23, 33 and 43, are provided for magnetic circuits 20, 30 and 40, respectively. These energizing coils should be so energized that the polarity of each magnetic field is properly related one to another to produce the desired conical concentration and not to furnish an interference one with another.

In this arrangement I have disclosed a ring electrode 38 insulated from the wall of enclosure 36, by a strip of insulation 39. This electrode 38 is raised to a small potential so as to spread the electron beam prior to its impingement upon target electrode 15.

Figure 3:
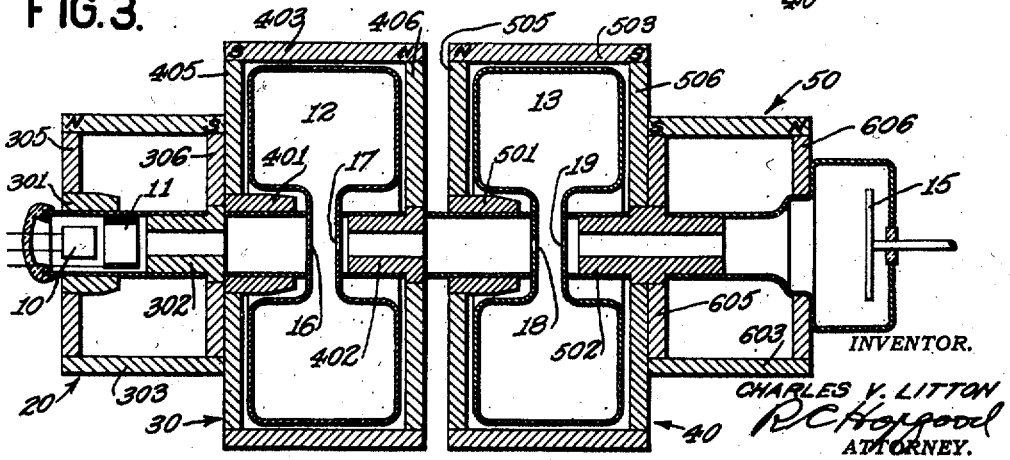
Fig. 3 shows a further modification of my invention using permanent magnets to produce the control.

In Fig. 3 I have illustrated a third embodiment of my invention. This embodiment is similar to Fig. 2 in that it is a system for providing individual magnetic circuits for the cathode beam arrangement and for each of the resonant chambers 12, 13. However, instead of using electromagnets, the arrangement shown in Fig. 3, provides permanent magnets for producing the concentrating field. Accordingly, the magnetic circuit 30 for concentrating the electron stream as emitted from a cathode comprises a permanent magnet 303 which may be made in the form of a tubular ring. Soft iron pole pieces 301, 302 are provided for producing the concentrating field and these pole pieces are connected with the opposite ends of magnets 303 by means of soft iron rings or spiders 305, 306. The magnetic circuit 30 about resonant chamber 12 comprises a permanent magnet 403 having pole pieces 401, 402 and spiders 405, 406 interconnecting the permanent magnets and the soft iron pole pieces. In order that the magnetic circuits may be properly operated and will not interfere with one another it is necessary that magnets 303 and 403, be arranged with like poles toward one another. A third magnetic circuit is provided around resonant chamber 13. This comprises a permanent magnet 503 with soft iron pole pieces 501, 502 and interconnecting spiders 505, 506. Pole pieces 502 if desired may be extended axially outward from magnet 503 and may serve as a further pole piece for a fourth magnetic circuit herein provided.

A fourth magnetic circuit is provided for the purpose of spreading the electron beam after it has passed through resonant chamber 13. This arrangement comprises a permanent magnet 603, associated by means of a spider or disc arrangement 605 with the extended portion of pole piece 502. Another pole piece which may be a soft iron ring 606 is provided at the opposite end of permanent magnet 603. It will be noted that the air gap between 606 and 502 is such as to provide a diverging magnetic field. Accordingly, the transverse component of this field will tend to spread the electron beam so that upon impingement on electrode 15 the energy will not be too highly concentrated.

While I have disclosed certain features of my invention independently in Figs. 1, 2 and 3, it should be distinctly understood that this is done for the purpose of simplifying the showing. It is clear that the various features of each of these arrangements which properly apply may be readily exchanged for systems shown in the other arrangements, or may be used in addition thereto. For example, if desired any one of the systems for spreading the electron beam or any combination of these systems may be used in a single tube structure. Furthermore, it should be realized that the magnetic structures shown are merely illustrative of the invention and that any modification in shape and arrangement of this structure may be made within the spirit of my invention. What I consider to be my invention and upon which I desire protection is embodied in the accompanying claims.

What I claim is:

1. A vacuum tube comprising means for producing a stream of electrons, means for modifying said electron stream, means for extracting energy from said modified electron stream, and a magnetic circuit including a relatively short air gap, said air gap extending along said stream for producing substantially converging lines of magnetic force in the direction of travel of the electrons of said stream to concentrate said stream into a small cross-sectional area, said means for modifying said electrons comprising a resonant chamber including a pair of grids having a single opening in the path of the electron stream, and wherein said magnetic circuit is generally coaxially disposed about said electron stream and comprises a first part between said electron producing means and said opening for producing converging lines of force to concentrate said beams before reaching said opening, and a second part disposed after the last of said openings, said second part producing converging lines of force to maintain said beam concentrated during traversal of said grid openings.

2. A vacuum tube according to claim 1, wherein said first part comprises an electro-magnet having oppositely directed pole pieces, between which magnetic flux lines pass, said oppositely directed portions being of different transverse dimensions.

3. A vacuum tube according to claim 1, further comprising a target electrode generally coaxial with said magnetic circuit, said target electrode receiving electrons from said beam after said electrons have passed said means for extracting energy therefrom, and magnetic means for diffusing the electrons of said beam before striking said target.

4. An electronic discharge device comprising means for producing a stream of electrons, means forming a resonant chamber longitudinally spaced from said electron producing means and in the path of said stream, said resonant chamber forming means including a stream-controlling element having a small opening in the direct path of the electron stream, said opening having a cross-sectional area substantially smaller than the initial cross-sectional area of the produced stream, and means for concentrating the produced electron stream into a beam having a cross-sectional area substantially less than that of said opening and uniform over a substantial portion of its length.

5. The combination according to claim 4, in which said last means comprises a pair of annular magnetic pole pieces each encompassing a substantially greater cross-sectional area than the opening in said control element, one of said pole pieces being positioned about and adjacent the electron stream producing means, and the other pole piece encompassing a cross-sectional area less than that of the said one pole piece, positioned about the electron stream intermediate the electron stream producing means and said control element.

CHARLES V. LITTON.